(12) United States Patent
Ahlstrom

(10) Patent No.: US 6,606,260 B2
(45) Date of Patent: Aug. 12, 2003

(54) SWITCH MODE POWER SUPPLY FOR A TELEPHONE ENTRY SYSTEM OR THE LIKE

(75) Inventor: John F. Ahlstrom, Chatsworth, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 09/984,341

(22) Filed: Oct. 29, 2001

(65) Prior Publication Data

US 2003/0081437 A1 May 1, 2003

(51) Int. Cl.$^7$ ................................................ H02M 7/00
(52) U.S. Cl. ....................................................... 363/125
(58) Field of Search ............................ 363/84, 89, 125, 363/126, 127

(56) References Cited

U.S. PATENT DOCUMENTS

| 3,576,443 A | * | 4/1971 | Brown | ......................... 307/12 |
| 6,038,154 A | * | 3/2000 | Boylan et al. | ............... 363/127 |
| 6,041,106 A | | 3/2000 | Parsadayan et al. | |
| 6,101,108 A | * | 8/2000 | Wittenbreder, Jr. | .......... 363/65 |

OTHER PUBLICATIONS

Thunderbyrd Power Systems, Inc., "What is Power Factor?", www.webcom.com/tps/whatispf.html 3 pages "No date".

Owner's Manual —1803PC, 1815, 1817—PC Programmable Telephone Entry Systems, DoorKing, Inc., 3/01 67 pages.

\* cited by examiner

Primary Examiner—Adolf D. Berhane
(74) Attorney, Agent, or Firm—Fitch, Even, Tabin & Flannery

(57) ABSTRACT

A switch mode power supply that may be used for a telephone entry system (TES) or the like with a power factor approaching 1.0. Rectified DC from a full wave rectifier is passed to a pair of inductors that are alternately sinking and sourcing current thereby drawing a more uniform input current because current constantly flows through the full wave rectifier to both of the inductors. A pair of FETs, each connected to one of the pair of inductors, are alternately turned on and off such that current from the current sinking inductor is shunted to ground. When one inductor is sinking current (i.e., through an active one the FETs) the other inductor is sourcing current to charge a filter capacitor and thereby provide an essentially constant unregulated voltage. The unregulated voltage at the capacitor is supplied to voltage regulators which in turn supply regulated voltage. At steady state, all current being supplied by the sourcing inductor is passed directly to and through the voltage regulators.

42 Claims, 8 Drawing Sheets

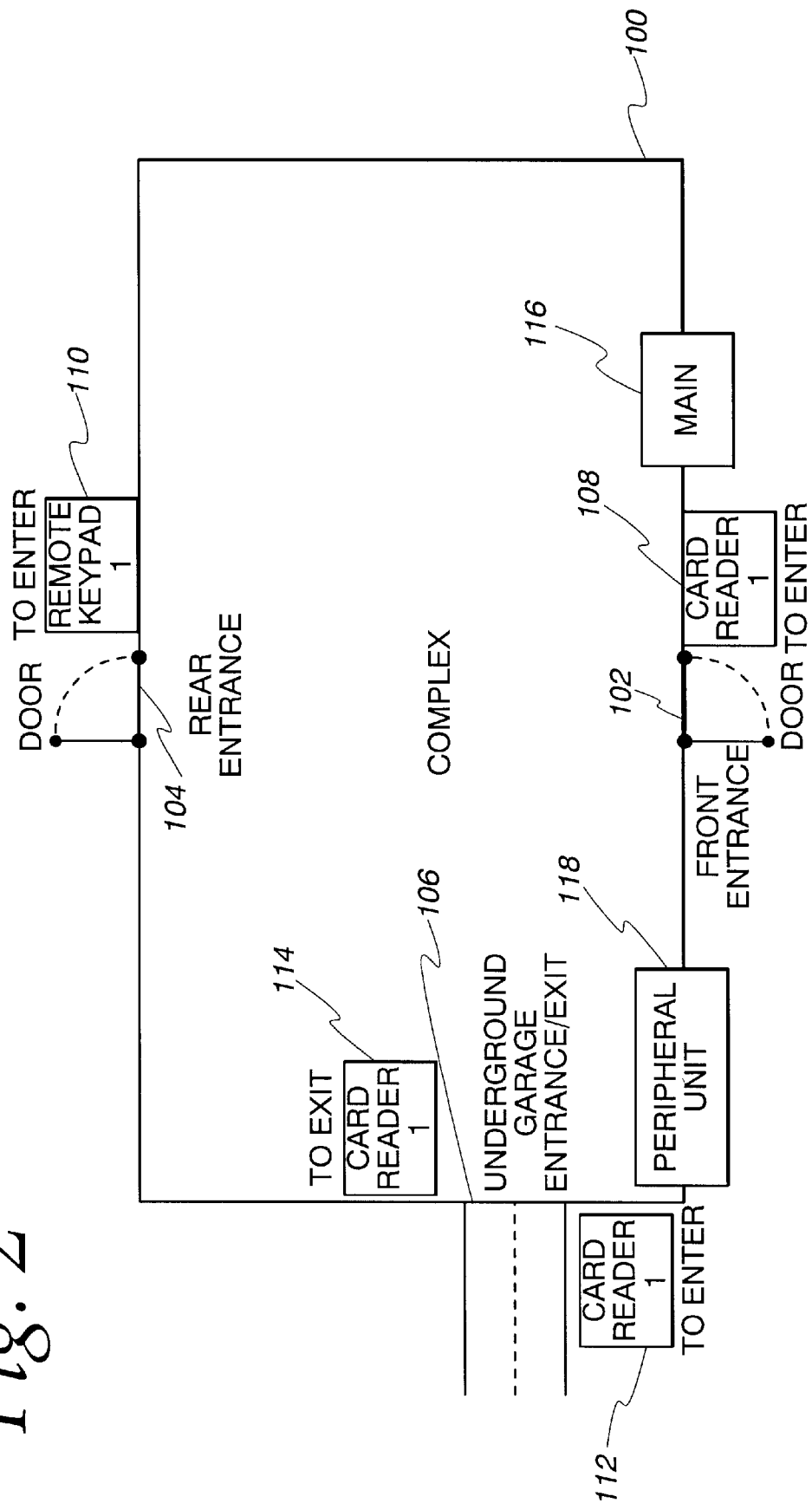

SWITCH MODE POWER SUPPLY FOR A TELEPHONE ENTRY SYSTEM OR THE LIKE

RELATED APPLICATIONS

The present invention is related to U.S. patent application Ser. No. 09/984,342 entitled "ACCESS CONTROL SYSTEM HAVING A PROGRAMMABLE AUTOMATIC NOTIFICATION FEATURE" to J. Ahlstrom et al.; U.S. patent application Ser. No. 09/984,343 entitled "ACCESS CONTROL SYSTEM HAVING TENANT CODES THAT MAY BE SELECTIVELY DISPLAYED" to J. Ahlstrom et. Al.; and U.S. patent application Ser. No. 09/984,344 entitled "ACCESS CONTROL SYSTEM IN SEAMLESS COMMUNICATION WITH PERSONAL MANAGEMENT SYSTEMS AND THE LIKE" to W. Dow et al.; all filed concurrently herewith and assigned to the assignee of the present invention.

BACKGROUND OF THE INVENTION

1. Field of the Invention

The present invention is related to switch mode power supplies and more particularly to small systems power supplies for entry control systems and the like.

2. Background Description

Apartment buildings, office buildings, condominium complexes, gated residential communities, industrial parks and other secured locations often include an entrance access control system. One type of access control system, known as a telephone entry system (TES), provides building security as well as tenant access control to a particular building, apartment complex, etc. The access control system controls entry at one or more other building entry points, e.g., doors, garage doors, etc. A typical access control system includes a main control unit located at a primary entrance and depending on the size of the structure or area being monitored additional remote units may be provided to control remotely located doors. The access control system may also monitor the connected entry points for unauthorized access. For a TES type access control system, visitors wishing to enter the building/complex contact tenants or other building personnel over the TES who are capable of admitting the visitor by remotely unlocking the entrance, e.g., from the tenant's apartment.

The main control unit controls the main entrance and may include a keypad and auto-dialer and be connected to a public telephone line. Remote units, typically communicate with the main unit to provide remote access to authorized personnel. The main unit can identify tenants seeking entry by personal access code, authorize entry, monitor for unauthorized entry at the remote doors, etc. A tenant directory may be displayed on the control unit itself or on an adjacent sign. The directory includes tenant codes which are corresponding directory numbers for each person, business or other parties in the building (tenants) that are capable of unlocking the entrance.

When a visitor enters a tenant code into the keypad, the main control unit automatically dials the corresponding tenant's telephone number. Then, the called tenant has an opportunity to establish the identity of the visitor. The tenant, using the same everyday telephone upon which the call was received, unlocks the entrance, e.g., by pressing a predetermined telephone number on the keypad. Currently, each main unit and connected remote units includes its own low voltage power supply.

FIG. 1A is a schematic of a state of the art power supply 50. Alternating Current (AC) is supplied through a typical, small wall transformer stepping voltage down from a 110 VAC to 9 VAC in this example. The 9 VAC is provided to a full wave rectifier 52, a bridge rectifier in this example. The bridge rectifier 52 rectifies the 9 VAC to provide a 9V rectified DC, which is passed to a capacitor filter 54. The capacitor 54 filters transients from the rectified voltage, providing an unregulated 9 volts DC that may include an acceptable ripple voltage. In this example, a voltage regulator powered by the unregulated 9V includes a zener diode 56 biasing a transistor 58 to provide 3V. The 3 volt supply regulator, converts the unregulated 9 volts to a clean 3 volt regulated output.

Once the capacitor 54 charges, essentially to the peak magnitude of the input AC, i.e., the upper magnitude of the rectified DC, the unregulated voltage across the capacitor 54 remains essentially constant. The unregulated voltage appears as a relatively clean DC (i.e., constant) voltage as long as the DC is unloaded. As long as the capacitor voltage remains constant, i.e., at no load, no current passes from the AC input through the rectifier to the unregulated voltage. However, the unregulated DC powers a voltage regulator which converts the unregulated DC to a supply voltage, e.g., 3 volts in this example. Typically, the regulator draws current for a load. Load current discharges the capacitor 54 slightly between AC peaks, causing the ripple voltage on the regulated DC. So, the ripple voltage is symptomatic of load current discharging the capacitor 54 between AC voltage peaks and, then, recharging the capacitor 54 during each peak.

The amount of ripple is set by design. The load current may be specified small enough that ripple voltage on the unregulated DC voltage is less than 5–10%. Output current flows constantly from the capacitor 54; and, input current flows through the rectifier 52 only during a small portion of each AC cycle, i.e., at voltage peaks. Unfortunately, during these short periods when rectifier current does flow, very high input current flows.

FIG. 1B is a comparison of the AC input voltage 60, unfiltered DC 62, the filtered unregulated supply voltage 64 and current 66 through the rectifier generating the unregulated voltage and regulated voltages. For example, for a 3V DC supply to provide 0.1 Amps (0.3W), regulator transistor 58 continuously draws 0.1 Amps from the 9V unregulated supply (0.9W). For a ripple voltage less than 10% (0.9V), the total charge removed by load current (between peaks) must be replaced, roughly during 13% of each half cycle at each peak. Therefore, remembering that I=Cdv/dt, the current necessary to recharge the capacitor 54, averages about 0.8 Amps during that 13% recharge period of each cycle. So, much higher peak current flows through the rectifier 52 during the peak periods than the DC current being supplied. Further, since this peak current both starts (when the input voltage rises above the unregulated supply voltage) and terminates even more rapidly (when the input line voltage begins to reverse polarity) reactance from input path inductances can become significant.

Thus, to avoid component failure from high current or reduced supply voltages from inductance and resistive line losses (i.e., voltage drops across input line impedance), the bridge rectifier must be capable of handling brief but high peak currents and a higher gage wire must be used than the actual consumed power otherwise would merit. Also, if the AC input is a low voltage, e.g., 9 volts from a plug-in wall transformer, instead of typical house current of 110 volts, the input transformer must also be capable of handling this large peak current. Since input components such as the transformer must be heavier duty and the wire between the input transformer and the bridge rectifier must be a higher gage, they are more expensive than the average current (and correspondingly the power consumed) would otherwise necessitate.

Furthermore, power companies discourage high peak current requirements. The current from a single such small wall transformer to power a DC supply may account for an insignificant percentage of the total current required for a single house and so may not be a concern. However, aggregated over an entire neighborhood, where a large number of these small transformers are powering small DC power supplies, each adding higher peak currents, supplying the aggregate current can become a major problem. This is becoming the norm as small low voltage appliances are becoming popular. So, just as larger components are required for providing AC to these DC supplies, power companies must use larger generators, power lines, etc., to satisfy the aggregate peak currents for these neighborhoods.

The power consumption concern with these prior art supplies is quantified as power factor. Power factor (PF) reflects how efficiently electricity is being used. The power provided (apparent power) in kilovolt amperes (kVA) includes both the actual power used (consumed) in kilowatts (kW) as well as reactive power (also in kVA) and PF=consumed/apparent. Typically, power factor is lower in the presence of non-linear devices such as solid state or switch mode power supplies.

Power companies charge customers based on the apparent power supplied to a particular facility or home not on the actual power consumed. It is important to consumers to keep power costs low and so, to efficiently consume the power being provided. In other words, ideally, consumed power equals the apparent power and the power factor is one (1) or as close to 1 as possible. Unfortunately, the power factor for these low voltage DC supplies is much less than 1 and is roughly the DC power being consumed, which is proportional to the average current supplied, divided by the magnitude power supplied, which is proportional to the peak line current. Thus, as noted above, the power typical factor may be 10–15% or very much less.

Another problem frequently encountered when upgrading or changing access control systems is that the existing power source may be incompatible with the new access system, e.g. AC versus DC, 12 volts versus 9 volts, 50 Hz versus 60 Hz, etc. It may be difficult to locate the original power source or the low voltage power transformer supplying the power source. Locating and/or replacing the existing power sources may require extensive time to search for the power transformer and, once it is located, removing and replacing it may require extensive digging and upheaval of the surrounding area.

Thus, there is a need for an access control system which can operate on any power that may be available without requiring locating and replacing the original power transformer. There is also a need for power supplies with a power factor approaching one.

SUMMARY OF THE INVENTION

Accordingly, it is a purpose of the present invention to simplify TES installation;

It is another purpose of the invention to improve power factor for switch mode power supplies;

It is yet another purpose of the invention to improve TES power consumption;

It is yet another purpose of the invention to reduce power wasted in a TES;

It is yet another purpose of the invention to increase TES power supply efficiency.

The present invention is a switch mode power supply that may be used for a telephone entry system (TES) or the like. Rectified DC from a full wave rectifier is passed to a pair of inductors that are alternately sinking and sourcing current thereby drawing a more uniform input current because current constantly flows through the full wave rectifier to both of the inductors. A pair of FETs, each connected to one of the pair of inductors, are alternately turned on and off such that current from the current sinking inductor is shunted to ground. When one inductor is sinking current (i.e., through an active one the FETs) the other inductor is sourcing current to charge a filter capacitor and thereby provide an essentially constant unregulated voltage. The unregulated voltage at the capacitor is supplied to voltage regulators which in turn supply regulated voltage. At steady state, all current being supplied by the sourcing inductor is passed directly to and through the voltage regulators.

Thus, the power supply of the present invention has a power factor that is nearer to 1.0. Advantageously, input transformers and connecting wires may be smaller, rated for lower current, lower gage and so less expensive. Further, a prior art low voltage supply may be replaced with a preferred embodiment switching mode power supply using existing transformers and wiring, thus avoiding the expense and problems of locating, replacing and rewiring the existing transformer.

BRIEF DESCRIPTION OF THE DRAWINGS

The foregoing and other objects, aspects and advantages will be better understood from the following detailed preferred embodiment description with reference to the drawings, in which:

FIG. 2 shows an example of a typical building with a simple telephone entry system (TES) according to the preferred embodiment of the present invention;

DESCRIPTION OF THE PREFERRED EMBODIMENTS

Figure 1A:
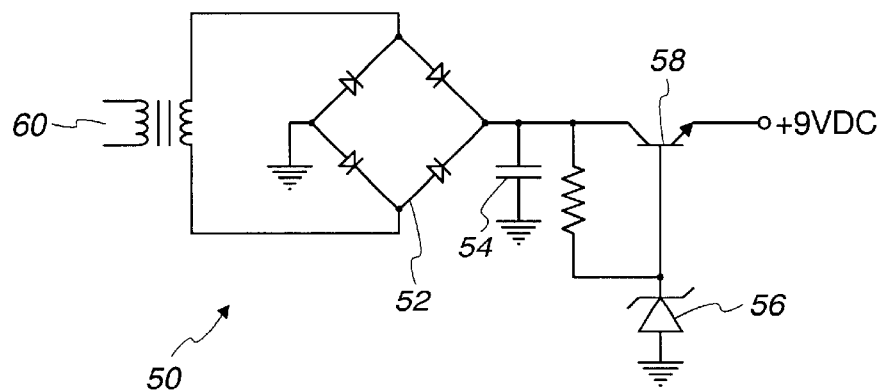
FIG. 1A is an example of a prior art power supply.
Figure 1B:
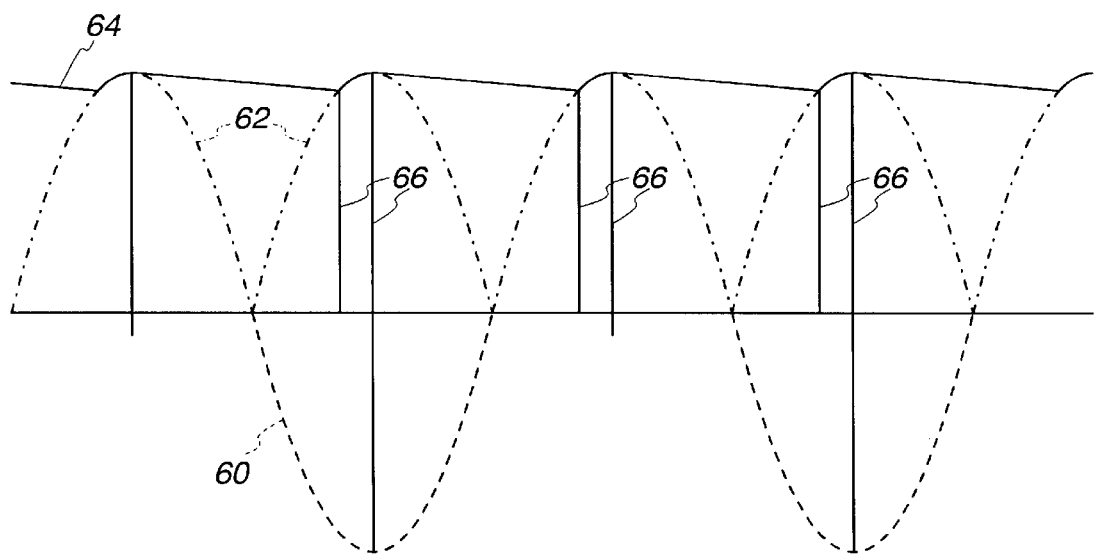
FIG. 1B shows AC voltage, DC voltage and input current relationships of the prior art power supply of FIG. 1A.

Turning now to the drawings and more particularly, FIG. 2 shows an example of a typical building 100 with access controlled by a telephone entry system (TES) that is powered by a preferred embodiment switch mode power supply of the present invention. The building 100 of this example includes a front entrance 102, a rear entrance 104 and a garage entrance 106. In this example, the front building entrance 102 is located on a street and the garage 106 empties onto a side street. A card reader 108 is located at the front entrance 102. A remote entry keypad 110 is located at the rear entrance for entering access codes. The garage entrance 106 includes both an external card reader 112 for requesting entry and an internal card reader 114 for requesting exit. A main control unit 116 controls building entry directly at each of the front entrance 102 and rear entrance 104. Further, to allow for the distance of the garage entrance from the main unit 116, a peripheral unit 118 controls the garage door and communicates with the main unit 116, passing entry/exit requests from the garage entrance card readers 112, 114 to the main unit 116 and, upon receipt of an authorization response to such a request, opens/closes the garage door. Card readers 112, 114 may include well known Weigand protocol card readers, Barrium Ferrite and Proximity Readers or ClikCard Receivers, for example.

Tenant or contact codes may be displayed on the main unit 116. The code sequence length for granting access is arbitrary and depends on the configuration of the particular unit. The preferred embodiment TES, recalls and dials tenant telephone numbers and responds to signals from their telephones to unlock a door, open a gate or open another connected device.

These directory contact codes prompt the system to call a particular tenant. Each directory code entered into the main control keypad points to the telephone number of a corresponding tenant. A visitor may enter a tenant contact code into the main unit to call and communicate with an associated tenant. Tenant contact codes can be linked to the tenant's card or entry code, and may be deleted once the tenant leaves the building, e.g., moves out, thereby removing the tenant's building access authorization. Thus, each tenant must be associated with at least one individual contact code. All codes are not required to be displayed in the directory display, i.e., some codes may be unlisted.

This unlisted number feature allows tenants that desire privacy and wish to restrict awareness that they are tenants of the building to prevent their contact code from being displayed. Also, tenants with an unlisted telephone number may wish to have an unlisted contact code. So, unlisted contact code numbers are not listed in the display directory and are not displayable. Thus, only visitors that know an unlisted contact code can enter the code to contact the tenant. Without knowing the unlisted contact code visitors do not have information to contact the tenant. Also, tenants may select a tenant Do-Not-Disturb (DND) feature to block calls to the tenant during a selected period.

So, for example, where the preferred TES controls access to an apartment complex, a visitor arriving at the building or complex, can locate the tenant contact code on the main control unit 116 directory, provided the code is listed. Then, the visitor may select or enter a directory code, and the preferred embodiment system will dial an associated telephone number without the visitor knowing the tenant's telephone number. Upon answering the call, the tenant may initiate one of four actions by dialing a number on the telephone. These actions may include, for example, activating a first relay to open a front door or entry gate; activating a second relay to open another door or enable whatever device is controlled by the relay, e.g., an elevator; and, continue to talk to the visitor.

In addition, building tenants can access the building using the preferred embodiment TES. Typically, each tenant has an assigned access code and/or card to access the complex. As the tenant enters a corresponding access code on a keypad or, cards in using a card reader (connected to one of the main control units 116 or peripheral unit 118. The system checks to determine if the entered access code is valid. If the code is valid and access is not restricted for the particular entrance, the system grants access by unlatching the entrance, e.g., opening a front gate or garage door.

Access codes are programmably enabled to allow tenants to enter or exit through one or more gate(s) or door(s). Entrances are symbolically linked to the tenant's access code and links may be deleted when a tenant moves out. Entry cards, like access codes authorize entry. Thus, swiping the card through an entry card reader or touching a smart card to a smart card reader, provides access at an authorized entrance. Authorizations for entry cards as well as access codes may be restricted to certain entrances and for selected time periods or generally authorized for all building entrances and at any time. A validated door structure (VDS) grants tenant access to a set number of doors, and may deny access to other doors. So, for example, a VDS may be created authorizing tenant access to the front and back door, but not to a manager's door or a garage door. A second VDS may be created for the manager to authorize access to all doors.

Also, access restrictions may be placed on codes to reduce the possibility of a card or code being used by more than one person. Period restricted or time zone access may limit the times of day that access is allowed through a particular entry location, e.g., access may be restricted only to the front entrance of a building during night hours. An anti-pass back restriction may be one of two types, either true or timed anti-pass back. True anti-pass back requires that each entry be matched by an exit before re-entry is allowed. Timed anti-pass back requires that a defined period of time pass before the same card or code may be used again for re-entry by the same reader or keypad. If the timed anti-pass back feature is set to time out in sixty seconds, for example, the system will not grant access to anyone trying to re-enter using the same code or card at the same reader until, for example, sixty seconds have elapsed from the most recent entry.

Likewise, a Strikes-And-Out feature may be included to prohibit unauthorized persons from guessing an entry code. The Strikes-And-Out feature allows a selected number of erroneous code entries before temporarily disabling a code reader at a particular door for a specified amount of time. An anti-pass back forgiveness feature may be timed, such that after expiration of the forgiveness period, entry using the same code or card may be resumed. So, for example, after midnight entry may be made re-using a blocked code or card to the same building.

For convenience, use frequency limits or period limits may be placed on cards or access codes, to allow issuance of temporary cards or access codes that are authorized for limited numbers of uses or for a limited period of time. Use limited codes or cards grant entry for set number of uses. Thus, a code or card may be authorized for sixty uses over the course of a month, for example. Once the card use exceeds that sixty-use limit, the code or card is no longer valid and the card may be discarded. Period limits may include date limitation wherein cards or access codes are authorized for entry until a specified date, i.e., an expiration date. For example, a tenant may be scheduled to move out of the building on December $_1$st of the current year. The expiration date for that tenant's card or access code may be set for December $_1$st and thereafter, access to the building is not authorized for either the card or access code. First-Use time limited cards or access codes authorize entry for a set number of days/hours/minutes after first use. For example, a tenant may have access for an unspecified week which begins to run upon the first entry. After the first entry, the tenant can use the card/code to enter and exit the building for a week until the period expires and the card/code is no longer valid. Start-Now time limited cards/codes are similar to First-Use time limited cards/codes providing authorized access over a period of days/hours/minutes beginning immediately.

Figure 3:
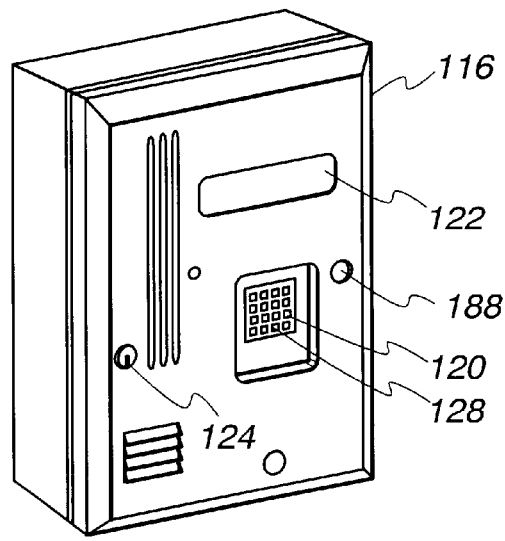
FIG. 3 shows an example of a main control unit.
Figure 4:
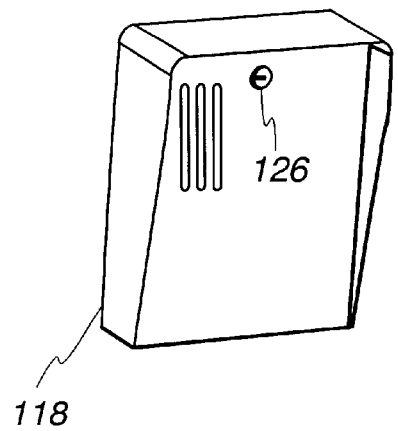
FIG. 4 is an example of a peripheral control unit.

FIG. 3 shows an example of a main control unit 116 and FIG. 4 shows an example of a peripheral unit 118. The main control unit 116 houses a main system motherboard (not shown) as well as TES software and building/tenant related data. A keypad 120 is included on the main unit 116 for numeric code entry, e.g., entering access codes or tenant phone numbers to contact tenants. A display 122 is provided for displaying telephone numbers stored in the system, as well as providing interactive information and for viewing any diagnostic information that might be displayed during entry or normal maintenance. Both the main control unit 116 and the peripheral unit 118 include keyed access points 124, 126. Unlocking each unit's housing provides access to system circuits contained within the particular unit 116, 118.

The main unit control 116 includes four internal relays and preferably is capable of supporting four (4) peripheral units 118. Further, in this embodiment each peripheral unit 118 includes four relays. Thus, besides pedestrian access control, relays can by employed for generating alarms, bypassing an alarm, providing elevator access control, controlling close circuit television (CCTV), controlling a gate operator and, for heating and air-conditioning system control. Each of the main control unit 116 and peripheral units 118 also include an interface for an exit request sensor and door position sensor. When attached, the exit request sensor senses when a request is placed for exit through the door, e.g., a button is pushed to request exit. A door position sensor senses when a door has been pried open or is otherwise open and/or remains open, e.g., for more than a minute after a relay deactivation.

Messages such as greetings, general information or warnings may be programmed into the main unit 118 for display on the display 122. A series of system menus are provided on the display 122 for manually programming the preferred embodiment TES. These menus are navigable using a menu prompt, scrolling through each menu level to identify and select an active value that corresponds to a desired menu action. The menus may be navigated by pressing numbers or characters on the keypad 120 that prompt a currently displayed option. Command prompts may be identified as appropriate, such as using a designated character, underscoring, highlighting or placing a cursor below the prompt. Further, depending on the number of displayable lines on the main control unit display 122, scrolling up and down the menu lines may be required as the number of current menu lines may exceed the number of lines that may be displayed. Further, the preferred embodiment TES may convert messages to a foreign language, e.g., by pressing a main control keypad 120 number to select displaying messages in Spanish.

A manager call button 128 may be included on the keypad 120. Pressing the manager call button 128 prompts the system to call a preselected manager's telephone number. Up to four different manager telephone numbers can be accompanied with a call schedule for each number such that calls are placed to selected ones of the manager phone numbers depending on the time of day, for example. A programmable manager's call schedule, sets times when visitors are allowed to contact the manager. Call schedules for up to four managers may be programmed with each manager having up to four sub-schedules and each sub-schedule having up to four segments. Also, the manager call button may be selectively disabled to prevent visitors from contacting the manger from the main unit during any period that it is disabled. So, for example, the manager call button may be disabled between midnight and 5:00 AM and the preferred embodiment TES would not respond to pressing the Manager call button during those hours.

Figure 5:
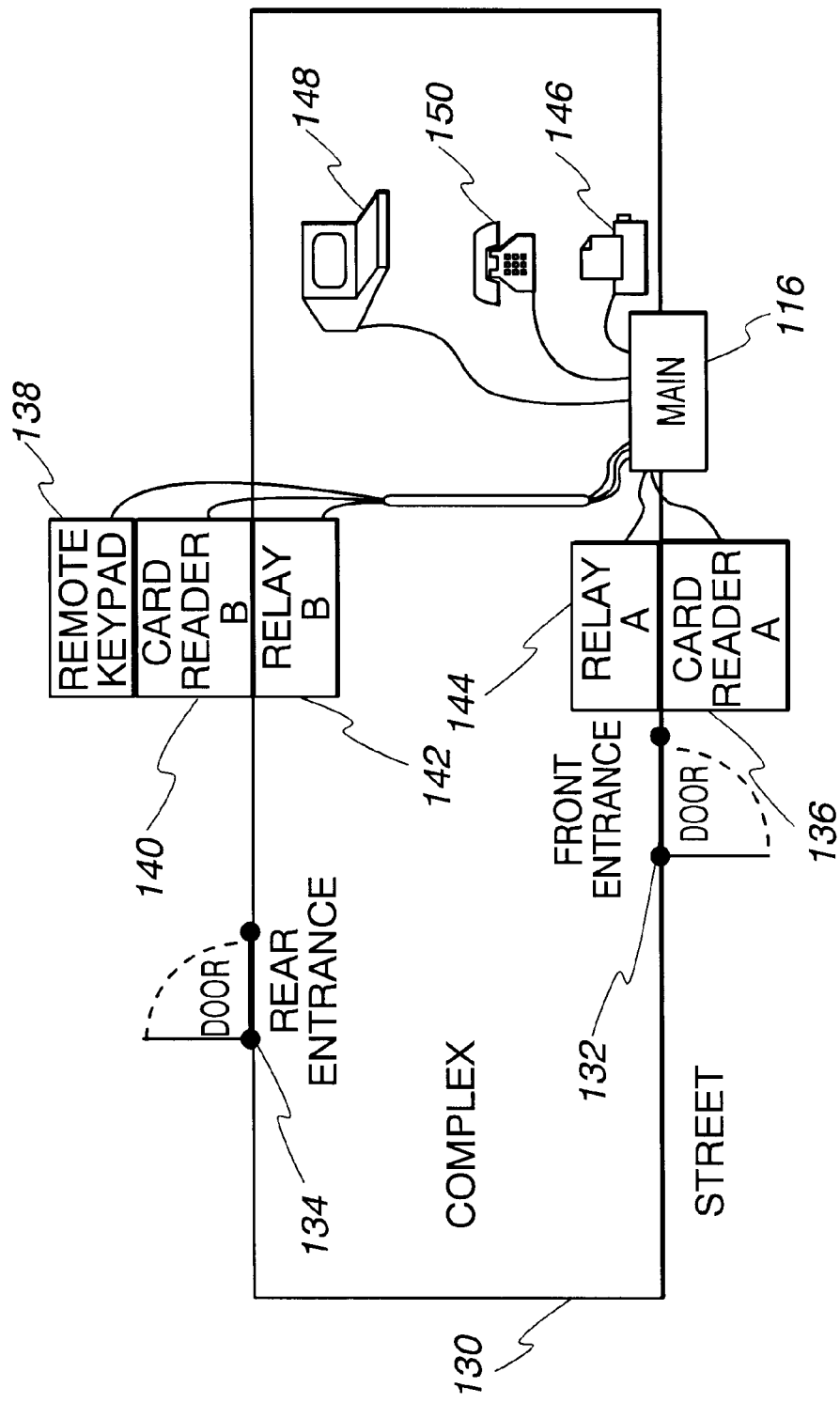
FIG. 5 shows an example of a minimum TES configuration.

FIG. 5 shows an example of a building 130 with a minimum TES configuration. Building 130 includes a front door 132 and a rear door 134, access through both of which is controlled directly by a main control unit 116. In this example, a card reader 136 is provided at the front door 132 for requesting access and a remote keypad 138 is at the rear entrance 136 for exit. Also, in this example of a simple TES, a card reader 140 is included at the rear entrance 136. Remote entry relays 142, 144 are provided, each controlled by the main control unit 116, to remotely open/lock the respective front entrance 132 and rear entrance 134.

Additionally, this example includes a printer 146, a computer terminal 148 and a telephone 150 connected to the main unit 116. The printer 146 is included for printing out periodic reports, periodic system dumps or diagnostics information. The computer terminal 148 may be used with SPS Win, for example, to program the control unit 116 and maintain databases and data contained therein. Telephone 150 provides another point of internal access to the system, telephonically and, correspondingly, to building tenants connected to the system. Also, the main control unit 116 accesses an external telephone system, e.g. for fax/modem communications functions.

The TES records all transactions including telephone calls and any other system activity and may send a report in any number of ways. For example, the fax modem may be used to fax the report to a remote fax machine, the printer may print the report locally, the display may display the report or, the modem may send the report to a remote computer terminal. Logged transactions may include activity such as visitor directory calls, tenant entry references (whether granted or denied), card or code activity and any other activities that the system manager may select. Further, reports may be scheduled for automatic transmission, at a previously selected time to a previously selected destination.

Figure 6:
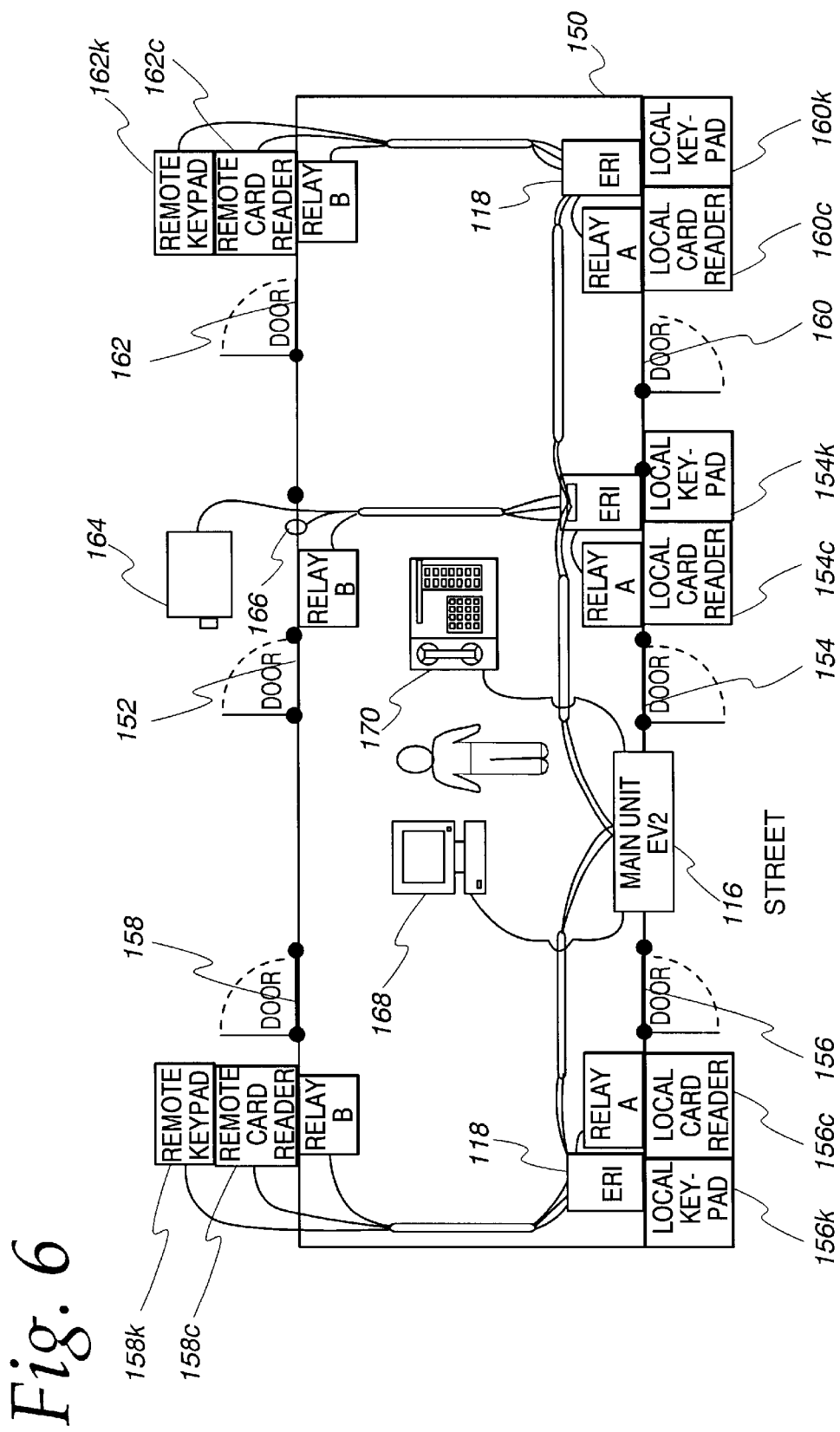
FIG. 6 is an example of a building with a multiple access point TES.

FIG. 6 shows an example of an expanded system with multiple access points in Building 150. In this example, a single main control unit 116 communicates with two peripheral units 118 to control remote entry. Main unit 116 controls both peripheral units 118 and directly controls access to central doors 152, 154. Each peripheral unit 118 controls access to a remote pair of doors 156, 158 and 160, 162. Further, each of a remote keypad 154k, 156k, 158k, 160k, 162k and a card reader 154c, 156c, 158c, 160c, 162c is located at each of the entrances 154, 156, 158, 160 and 162. In this example, a closed circuit television camera (CCTV) 164 connected to main unit 116 is located at entrance 152, for monitoring activity at that entrance. A button 166 may be located at door 152 to request exit from the building. A closed circuit TV monitor 168 is located internally to the building for monitoring activity at entry 152, e.g., by a guard and for granting access to entrance 152. The guard may authorize entry through telephone 170, through a dedicated input device (e.g., a button), through a computer or through any other appropriate device. Each of remote peripheral units 118 and main unit 116 controls a pair of relays labeled A and B, each of which remotely opens/closes or locks/ unlocks a respective one of the doors.

Each of the main control unit 116 and any connected peripheral units 118 may be configured for one-door control or two-door control. For one-door configuration, the unit controls one door for entry or exit and includes three other relays that are available for other functions such as, shunting or by passing an alarm, triggering an alarm or activating a closed circuit TV. For a two-door configuration two relays are available for shunting or rerouting an alarm.

When a tenant swipes a card or enters a code, the TES response may include one or more relay actions, e.g., a door will cycle, the CCTV will cycle on, etc. A relay activation structure (RAS) controls relay responses to entry cards or codes. Each RAS defines one or more relay responses and is associated with an entry card or code. Relay commands are provided for programmable individual relay control and select relay response to an entry request. A cycle command causes a selected relay to respond by opening and then closing after a period of time, e.g., buzzing in someone to a locked building. A latch-open command energizes the relay, for example, to unlock the door and leave the door unlocked until prompted to re-energize the relay, thereby re-locking the door. A latch release command returns the relay action to a default setting, e.g., if the door is open after responding to a latch open command, issuing the latch release command returns the corresponding relay control to the cycle state. An initial default state may be selected such that relay control is set to that default state upon system power up.

The system may monitor door status to determine whether it is held open more than a predefined maximum time and, otherwise, determine whether a controlled door is stuck open, i.e., a building security breach may have occurred. An open door condition may elicit an alarm call wherein using the modem, the system transmits an alarm message to a designated computer or to a fax machine. Alternately, the system response to an open door may be to close a relay that turns on an alarm light or sounds a siren to inform a monitoring station of the perimeter breach.

When an alarm is triggered (e.g., because a door has been forced open), the preferred embodiment TES automatically sends an alarm message over the modem to a designated recipient e.g., a computer terminal or a fax machine. The alarm message typically includes an alarm unit ID to identify the open door so that the message recipient knows the alarm origination point. The alarm call unit ID is programmable in the TES as is the number of retry times for dialing the number. Also, alarms may be enabled or disabled, e.g., for maintenance purposes. In the event of an alarm, the preferred embodiment TES reports the alarm by calling a previously designated location, which may be a fax machine, a terminal connected through a modem, an alarm company or to a pager. If the location does not answer the call or the number is busy, the control unit repeatedly hangs up and redials the same number until the system connects or, until the redial retry number is met. If, alternately, a direct connection is provided to a computer, printer or other reporting device, the TES reports the alarm condition occurrence directly, posting or printing a message that indicates the occurrence, e.g., on the attached printer.

Figure 7:
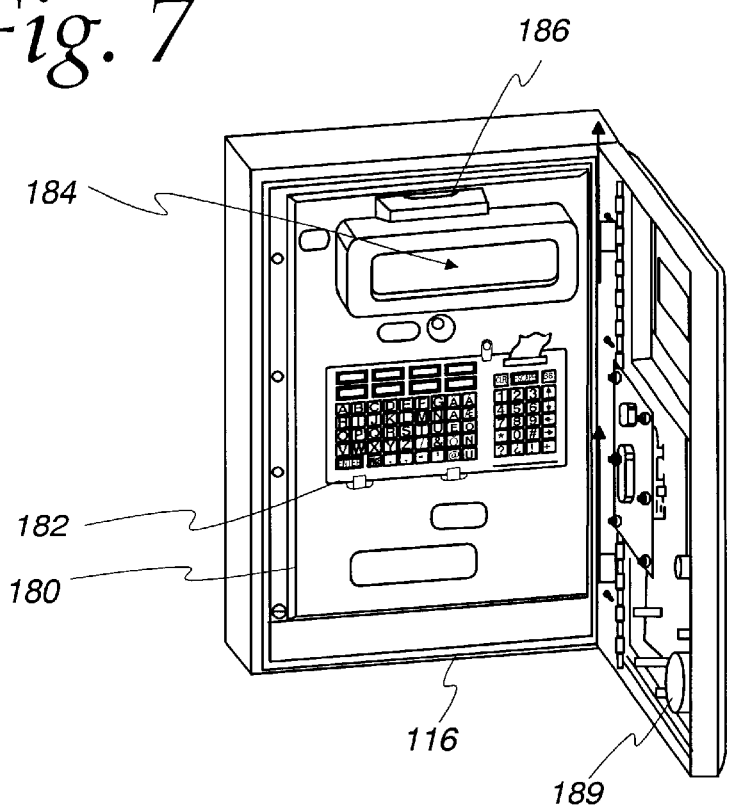
FIG. 7 shows a main control unit upper electronics assembly in an internal view.

FIG. 7 shows upper electronics assembly 180 in an internal view of an open main control unit 116. The upper electronics assembly 180 includes a detachable handheld keypad 182 and a display 184 which may be a liquid crystal diode (LCD) display. A pluggable memory module 186 is shown inserted at the top of the upper electronics assembly 180. The pluggable memory module 186 is, preferably, flash electronically programmable read only memory (Flash EPROM). Local audio communications may be effected in an intercom-like or speaker phone fashion through the faceplate of the main control unit 116 using a microphone 188 and speaker 189.

Two types of data that may be saved or reloaded into the main control unit using the pluggable memory module 186. These two types of data include, unit data and operating data necessary for normal operation and is inserted during initial installation. Unit data includes user-generated data for the particular control unit. Such user-generated data may include code entries for tenants. Operating data includes any data required by the main control unit to operate. A backup module may be inserted periodically to backup/restore unit or operating data from/to the control unit memory. The backup module also may be used for upgrading the control unit operating system.

Figure 8:
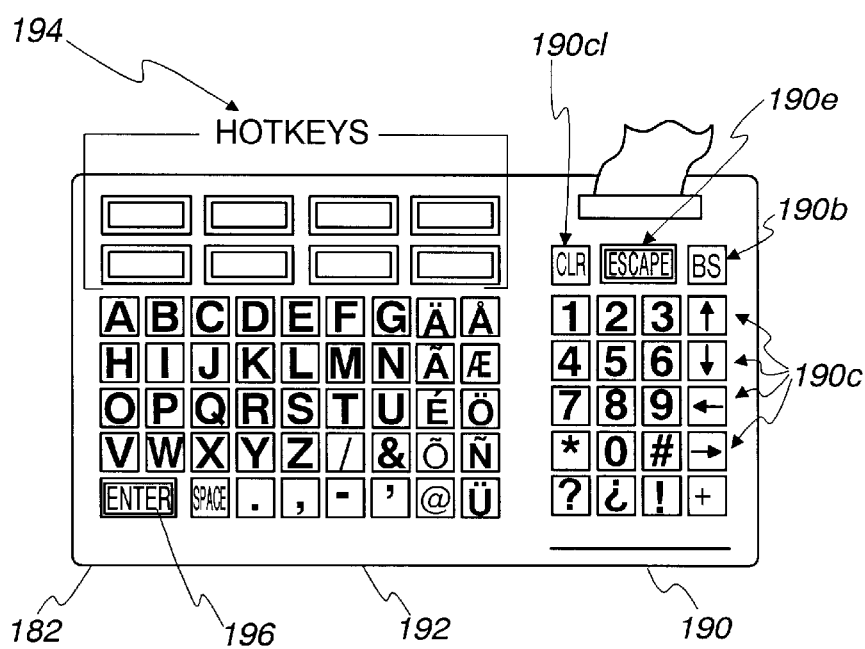
FIG. 8 is an expanded view of the detachable handheld keypad.

FIG. 8 is an expanded view of the detachable handheld keypad 182. The handheld keypad 182 includes a numeric section 190 and an alphabetic section 192. The numeric section 190 includes several cursor keys 190*c*, a backspace key 190*b*, an escape key 190*e* and a clear key 190*cl*. The cursor keys 190*c* facilitate navigating between displayed menu entries, e.g., on the display 184 in FIG. 5. The backspace key 190*b* functions to eliminate a single previously entered number or character at a time. The escape key 190*e* may be used for canceling an erroneously entered command key sequence and/or terminating a command, i.e., aborting. A single stroke of the clear key 192*cl* clears displayed entries.

The alphabetic section 192 includes several hot keys 194, typical alphabetic keys and an enter key 196 as well. The hot keys 194 include a number of shortcut keys for bypassing menu navigation and directly selecting and initiating a previously stored procedure. Hot keys 194 may include, for example, an enter phone number key for adding a new phone number to the stored listing; a delete phone number key may be included for removing entries from the list; and, an enter code key and a delete code key may be included for adding/removing codes from the listing. Card authorization may likewise be managed with enter card and delete card keys. A time/date key may be included for recalling and updating system time. A transaction key may be included for recalling and viewing logged system activity such as for example, visitor to tenant directory calls, tenant entry (granted or denied) and card or code activity. While each of these corresponding commands may be otherwise effected through a series of alphanumeric key entries, hot keys 190 provide a much simpler faster shortcut.

Figure 9:
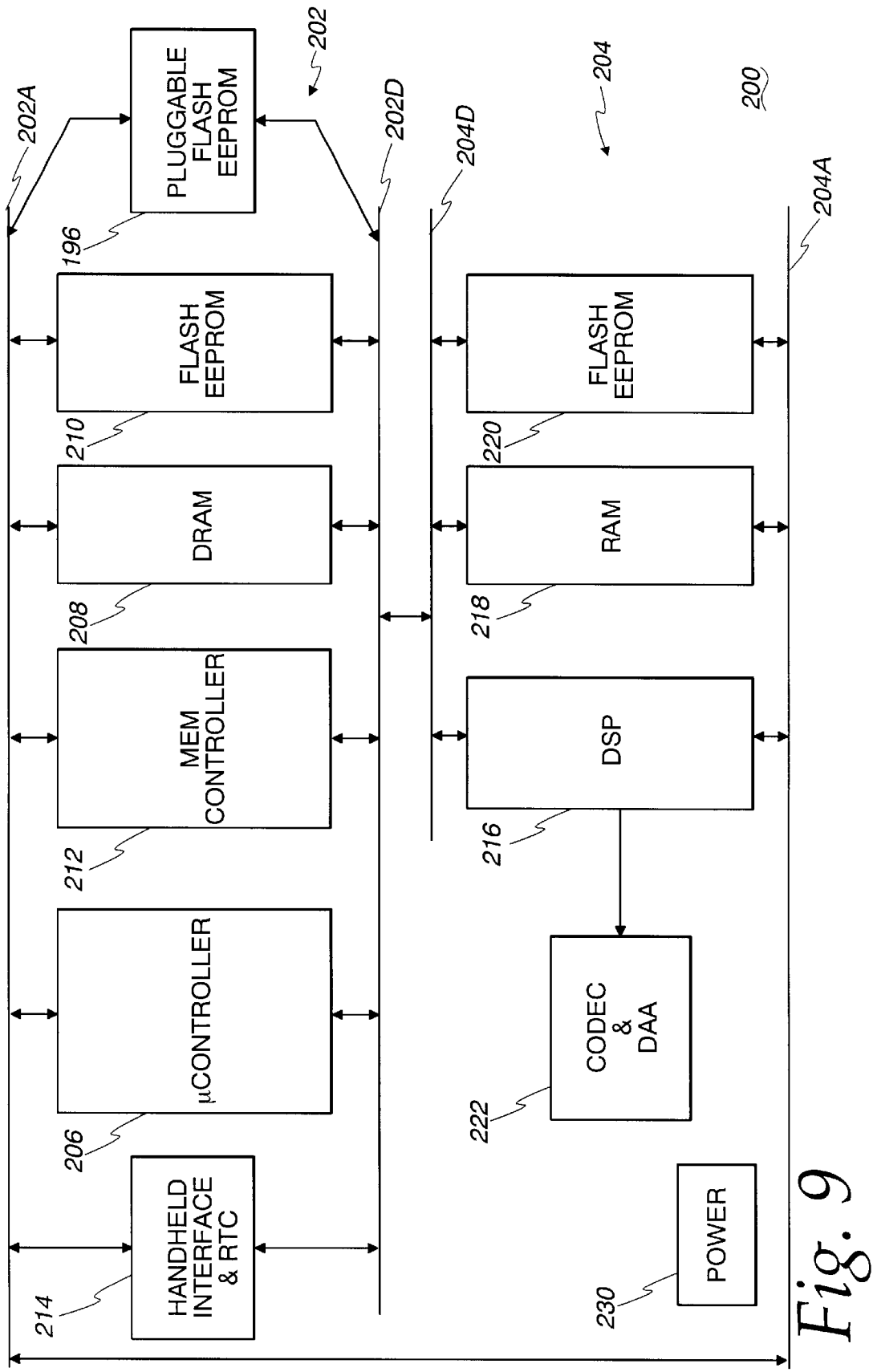
FIG. 9 shows a block diagram of a motherboard enclosed in the main control electronics assembly.

FIG. 9 shows a block diagram of the motherboard 200 of the electronics assembly according to the preferred embodiment of the present invention. The motherboard 200, essentially, includes two subsystems, a control subsystem 202 and a signal processing subsystem 204. Further, each subsystem 202, 204 includes an address bus 202A, 204A and a data bus 202D, 204D.

The control subsystem 202 includes a microcontroller 206, which may be a general purpose microprocessor or, preferably, is a 16-bit, single chip controller such as the XA-S3 microcontroller from Philips Semiconductors. The control subsystem 202 includes memory, preferably, both dynamic random access memory (DRAM) 208 and Flash EPROM 210. If necessary, a memory controller 212 may be included for controlling access to and refreshing the DRAM 208 or, if the microcontroller 206 is capable, the memory control function may be provided directly by the microcontroller 206. When installed in the main control unit 116 with the motherboard 200, the pluggable flash memory module 186 in FIG. 7 is also included in the memory in the control subsystem 202. A real time clock (RTC) and peripheral interface 214 also is included in the control subsystem 202.

The microcontroller 206 in control subsystem 202 manages a programmable transaction auto reporting function to automatically send a record of all transactions that are currently stored in the main control unit memory at the preselected time to a selected destination, e.g., to a terminal, fax or a printer. Transactions may include records of system activity such as a directory call, an open door, entry card or code activity, etc. Auto reporting may be triggered by count number, a specified day or time or, a combination of transaction count and day/time. Count only scheduling triggers a report automatically when the count reaches a specified number of transactions, as selected by the complex manager, for example. When the transaction count reaches that number, the transactions report is transmitted to the destination. If day/time reporting is selected, all log transaction are transmitted on a selected day and time. Count and day/time reporting allows transaction report transmission if the count reaches a selected level prior to the scheduled day/time.

As noted above, system transactions or records of system activity include records of events such as a directory call, an open door, entry card or code activity or anything else identified as system activity for logging or reporting. Reports are transmitted, for example, to a printer, a fax machine or a computer terminal. Since computer terminals do not have identical modem transmission capabilities, the preferred embodiment TES has a programmable baud rate, selectable for a particular computer terminal or printer. Optionally, the preferred embodiment TES may send transaction information in real time. Further, real time transmission may be programmed to begin at some future time and continue until the system receives a termination command to end real time transmission. Also, interactive report transmission may be selected to require a response to a manual prompt at the time of transmission. Thus, when the programmed transmission time occurs, the prompt is presented to an operator, e.g., the building manager, who may approve or deny transmission.

The heart of the signal processing subsystem 204 is a digital signal processor (DSP) 216, preferably, 24-bit DSP 56303 from Motorola Corporation. The digital signal processor 216 is connected to memory such as, for example, static RAM (SRAM) 218 and Flash EPROM 220. The digital signal processor 216 interfaces externally to the main control circuit 200 through a communications interface 222.

The main control unit communicates with the outside world through any number of connected optional interface devices that may be connected to the real time clock (RTC) and peripheral interface 214 or to the communications interface 222. The DSP data bus 204D is selectively connectable to the control data bus 202D and the DSP address bus 204A is selectively connectable to the control address bus 202A. A preferred embodiment switched mode power supply 230 provides DC power to the main control unit 200.

In particular, the RTC and peripheral interface 214 communicates with connected remote units, e.g., peripheral unit 118 above. Also, connected input/output (I/O) devices such as a display, e.g., an LCD display 184, an RS422 printer port, an RS232 serial port, keypads including handheld keypad 182, and card readers all communicate with and are controlled by the microcontroller through RTC and peripheral interface 214. Further, a real time clock in the RTC and peripheral interface 214 maintains current date and time information that may be used, for example, in logging or in timed operation. Programmable Time Zones are defined as time periods during which particular access codes and card codes are enabled. So, if a group of tenants is intended to have access to the complex only during certain hours and/or on certain days of the week, a time zone may be identified for those specific periods and that time zone assigned to that group of tenants. Each time zone may have four different schedules/segments with a maximum of fifteen different time zones. Further, holidays may be identified and included or excluded from particular time zones.

Also, a timed control system may be included for setting relay controls to automatically open/close or enable/disable certain connected functions or features at preselected periods. Thus, for example, the system may automatically unlock and open the front gate daily and later re-lock or close the gate, at times that are specified within the system. So, continuing this example, the front gate may automatically open at 7:00 am and close at 7:00 pm. Further, typical holidays may be identified such that the gate does not automatically open even if a holiday falls on a weekday. A free exit may be provided through any monitored door such that opening the door to exit does not cause a door forced opened condition during the exit. A post office and fire department entry feature referred to as a postal lock provides access using a lock and key. The local fire department may have a common key that allows access through the postal lock. Access tot he complex using either of these is through the access control system and treated as a normal entry.

Communication interface 222 provides both audio and telephonic communications interface functions. Audio communications may include sound from the main control unit microphone and speaker. Both the microphone and speaker volume may be controlled programmably. Telephonic communications may include providing a telephone handset interface for either or both of touch tone or rotary dial type telephones.

The modem provides for both incoming as well as outgoing communications. The modem may be set to answer an incoming call after a selected number of rings. A preselected length may be set for visitor to tenant calls to prevent unintentionally tying up the line by leaving a call connected indefinitely, blocking other calls to the tenant as well as to the control unit. Dialing may be selected for either touch tone or a pulse dialing depending upon local telephone company capabilities. If Caller ID is available, incoming telephone numbers may be logged for each call along with any corresponding system/tenant response or action.

If a voicemail system is attached to the TES, voicemail may be configured from the main control unit. Also, voicemail may be programmed to intercept calls and to screen visitors for tenants. To use this voicemail control feature of the preferred embodiment system, a visitor places a tenant call and the voice mail system answers the call. Then, the visitor can bypass voicemail and contact the tenant by dialing an extension (a number with up to six digits) on the front panel keypad. If Caller ID is available through the local telephone service, the system may retrieve the caller's number for the tenant to return the call later. A PBX enable/disable and dial-in feature provides call configuration capability to dial a number for outside access, e.g., 9. A dial-up unit ID feature allows assignment of a 6-digit identification number such that a person dialing into the unit can retrieve the unit ID to determine whether the caller has contacted the correct unit.

The preferred embodiment TES includes the capability to provide audible signals, e.g., beeps, in response to various inputs. So for example, an access granted beep may be provided by the main control unit speaker when granting tenant/visitor access. Also, talk time beeps on the telephone may indicate when visitor to tenant communication approaches the end of the selected talk period. These audible alerts may be disabled or enabled as desired.

Figure 10:
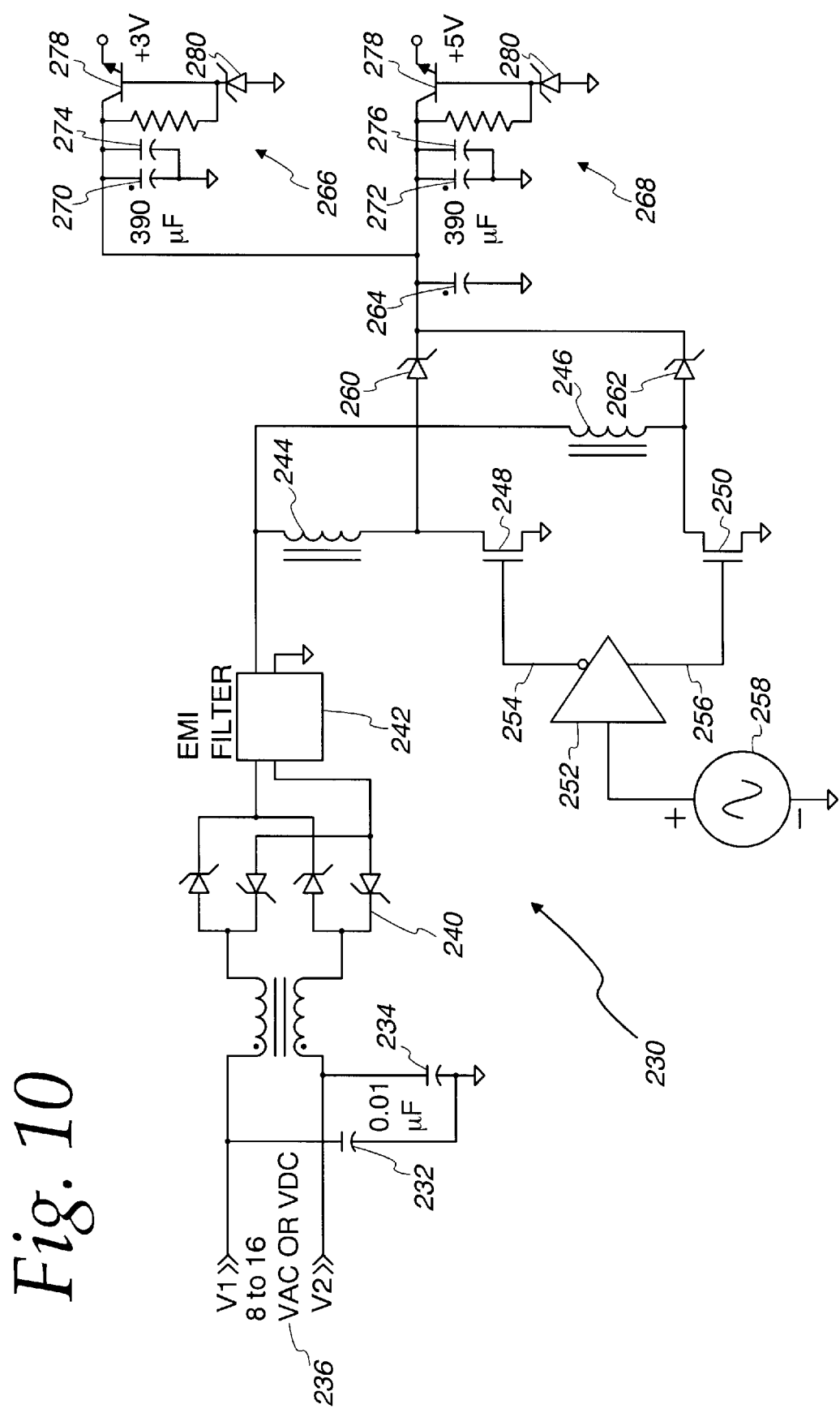
FIG. 10 is an example of a preferred embodiment switching regulator power supply.

FIG. 10 is an example of a preferred embodiment switch mode power supply 230 for supplying power individually to any of the above described main control units 116 and, optionally, to peripheral units 118. In this exemplary embodiment the input power may be either low level AC or DC, preferably 8 to 16 volts. Decoupling capacitors 232, 234 are provided at each side of the input 236. An optional balun transformer 238 is included between the input power 236 and a bridge rectifier 240. Accordingly, by virtue of inclusion of both the balun transformer 238 and bridge rectifier 240, input voltage is polarity independent. The rectified output from the bridge rectifier 240 passes through an optional electromagnetic interference (EMI) filter 242. One side of the essentially unfiltered, full-wave rectified output of the bridge rectifier (out of EMI filter 242 in this example) is grounded and the other (the positive side in this example) passes to one side of each of inductor pair 244, 246. The opposite side of each inductor 244, 246 is connected to the drain of a corresponding field effect transistor (FET) 248, 250, respectively, n-type FETs (NFETs) in this example. Driver 252 provides a pair of complementary outputs 254, 256 each driving a gate of a corresponding one of FETs 248, 250. Oscillator 258 provides a switching input to driver 252. The source of both NFETs 248, 250 are grounded. Each anode of a pair of diodes 260, 262 is connected to the corresponding drain of one of FETs 248, 250 at inductors 244, 246, respectively. The cathode of diodes 260, 262 are both connected to one plate of capacitor 264. The other plate of capacitor 264 is grounded. The common connection of the cathode of diodes 260, 262 at capacitor 264 is the unregulated output of the switching power supply.

In this example, two simple voltage regulators 266, 268, each supply regulated voltage outputs, which may be 5 volts and 3 volts, for example. In this example, an additional filter capacitor 270, 272 at the unregulated voltage input to each regulator 266, 268 provides additional low frequency noise filtering. Decoupling capacitors 274, 276 are included for high frequency noise decoupling at the voltage regulators 266, 268. Each voltage regulator 266, 268 is a transistor 278 biased by a zener diode 280 of appropriate voltage to maintain the specified regulated output voltage.

So, AC or DC, (e.g., 8–16V) is supplied to the line voltage input 236. As noted above, by virtue of the inclusion of the balun transformer 238, the polarity of the input is unimportant and passed directly to the bridge rectifier 240. The bridge rectifier 240 either passes DC voltage with the correct polarity (i.e., negative to ground and in this example) to the EMI filter 242, or rectifies the AC to provide DC to the EMI filter 242. The EMI 242 filter is included to eliminate any high frequency feedback from the regulator to the input AC or DC at 236. Preferably, the oscillating frequency of oscillator 258 is 20 KHz and so, is much higher frequency than the normal AC input (typically 50–60 Hz) such that during each pulse/cycle of the oscillator, the full-wave rectified DC appears to be constant at the instantaneous voltage of the rectified DC. In response to the oscillator 258, driver 252 provides inverted and non-inverted outputs at the oscillator frequency. Thus, the gates of NFETs 248, 250 are alternately driven high to turn on a respective NFET 248, 250. With one NFET (248 or 250) on, current flows through the respective inductor 244 or 246 from the bridge rectifier 240. When the on NFET (248 or 250) is turned off, the corresponding inductor (244 or 246) switches voltage polarity to maintain current flow, sourcing current through a respective diode 260 or 262, thereby charging capacitor 264. At the same time, the off transistor 250 or 248 turns on, pulling its drain low to ground, reverse biasing the particular diode 262 or 260 and sinking current through the respective inductor 246 or 244.

Thus, inductors 244, 246 are alternately sinking and sourcing current thereby drawing a more uniform input current, because current constantly flows from the bridge rectifier 240 through both of the inductors 244, 246. When one inductor (244, 246) is sinking current (i.e., through an active one of NFETs 248 or 250) the other inductor (244, 246) is sourcing current to charge capacitor 264 and vice versa. The unregulated voltage at capacitor 264 is essentially constant e.g., at 30 volts. The unregulated voltage at capacitor 264 is supplied to the voltage regulators 244, 266, each of which in turn supply regulated voltage. At steady state, all current being supplied by the current sourcing inductor is passed directly to and through the voltage regulators 266, 268.

Although as described herein for simplicity with a single driver providing a pair of complementary outputs to drive NFETs 248, 250, it is understood that a more complicated circuit may be used as desired. For example, a National Semiconductor LM2524D Regulating Pulse Width Modulator may be used instead of the oscillator 258 and driver 252 with appropriate redrive circuits to drive FETs 248, 250. Further, additional and more complicated voltage regulators such as an LM2675M SIMPLE SWITCHER® Power Converter High Efficiency 1A Step-Down Voltage Regulator from National Semiconductor. Further, negative supply voltages can be effected simply by reversing bridge rectifier 240 connections (i.e., plus for minus)

Thus, the power supply of the present invention has a power factor that is nearer to 1.0. Advantageously, input transformers and connecting wires may be smaller, rated for lower current, lower gage and so less expensive. Further, a prior art low voltage supply may be replaced with a preferred embodiment switching mode power supply using existing transformers and wiring, thus avoiding the expense and problems of locating, replacing and rewiring the existing transformer.

Having thus described the invention, it is evident that various modifications and changes may be made without departing from the broader spirit and scope of the invention. Examples and drawings are, accordingly, to be regarded in an illustrative rather than a restrictive sense.

What is claimed is:

1. A power supply for supplying DC voltage comprising:
   a full wave rectifier receiving an input line voltage;
   a pair of inductors connected at least one end to one side of said full-wave rectifier;
   switching means for alternately switching an other end of each of said pair of inductors to a fixed reference voltage level;
   voltage passing means for passing a voltage from said other end of an unswitched one of said pair of inductors; and
   means for maintaining a constant unregulated DC voltage responsive to said voltage passed from said voltage passing means.

2. A power supply as in claim 1 wherein said switching means comprises:
a pair of transistors each connected at one conduction terminal to a second end of a corresponding one of said pair of inductors and connected at a second conduction terminal to an opposite side of said full wave rectifier at ground; and
a complementary driver driving a control terminal of each of said pair of transistors.

3. A power supply as in claim 2 wherein said voltage passing means comprises:
a pair of diodes, anodes of said pair of diodes each connected to a corresponding one of said pair of inductors at said second side, cathodes of said pair of diodes being connected together.

4. A power supply as in claim 3 wherein said means for maintaining a constant unregulated voltage comprises:
a filter capacitor connected at an unregulated voltage output between said cathodes and said other side of said full wave rectifier.

5. A power supply as in claim 1 further comprising:
voltage regulating means for providing one or more regulated DC voltage responsive to said unregulated DC voltage.

6. A power supply as in claim 5 wherein said full wave rectifier is a bridge rectifier.

7. A power supply as in claim 5 further comprising electromagnetic interference filtering means for blocking electromagnetic interference at said full wave rectifier from said pair of inductors.

8. A power supply as in claim 5 further comprising a balun transformer between said input line voltage and said full wave rectifier.

9. A power supply as in claim 5 wherein said fixed reference voltage is ground and said switching means comprises:
a pair of transistors is a pair of field effect transistors (FETs), each connected between ground and a corresponding one of said pair of inductors; and
a driver driving a pair of complementry outputs, each of said complementary outputs driving a gate of one of said pair of FETs.

10. A power supply for supplying DC voltage comprising:
a full wave rectifier receiving an input line voltage;
a pair of inductors connected at least one end to one side of said full-wave rectifier;
a pair of transistors each connected at one conduction terminal to a second end of a corresponding one of said pair of inductors and connected at a second conduction terminal to an opposite side of said full wave rectifier; and
a complementary driver driving a control terminal of each of said pair of transistors;
a pair of diodes, anodes of said pair of diodes each connected to a corresponding one of said pair of inductors at said second side, cathodes of said pair of diodes being connected together; and
a filter capacitor connected at an unregulated DC voltage output between said cathodes and said other side of said full wave rectifier.

11. A power supply as in claim 10 further comprising:
at least one voltage regulator receiving said unregulated DC voltage at said capacitor connection with said pair of diodes and providing regulated DC voltage.

12. A power supply as in claim 10 wherein said full wave rectifier is a bridge rectifier.

13. A power supply as in claim 12 further comprising an electromagnetic interference filter between said bridge rectifier and said pair of inductors.

14. A power supply as in claim 12 further comprising a balun transformer between said input line voltage and said bridge rectifier.

15. A power supply as in claim 12 wherein said pair of transistors is a pair of field effect transistors (FETs).

16. A power supply as in claim 15 wherein said driver provides a pair of complementary outputs, each of said complementary outputs driving a gate of one of said pair of FETs.

17. A power supply as in claim 16 wherein said diodes are a pair of zener diodes, said zener diodes being rated for a reverse bias voltage above said unregulated DC voltage, said zener diodes further providing over-voltage protection to each said at least one voltage regulator.

18. An access control system powered at least in part by a power supply as in claim 17, said access control system selectively providing access to a building and further comprising:
a main control unit powered by said power supply and telephonically in communication with entities within a building, said main control unit being mountable at an entrance to said building;
a display on said main control unit displaying contact codes for selected ones of a plurality of building tenants;
at least one code entry unit receiving access codes, each said code entry unit providing received said access codes to said main control unit; and
at least one controlled door, access through each said controlled door being provided by said main control unit in response to a correct access code entered at one said code entry unit, said main control unit logging system activity.

19. An access control system as in claim 18, said main control unit comprising:
a memory module;
an electronics assembly receiving power from said power supply and adapted to receive said memory module, said memory module being pluggable into said electronics assembly, said display being attached to said electronics assembly and receiving power from said power supply; and
an alphanumeric keypad, said access control system being programmed directly from said alphanumeric keypad, access control codes being programmed into said main control unit using said alphanumeric keypad, program entries being selectively communicated, seamlessly, to said general purpose computer.

20. An access control system as in claim 19 wherein said electronics assembly unit comprises:
a control subsystem controlling connected peripheral units and controlled doors, display of tenant codes, contacting a corresponding tenant in response to an entered contact code, receiving and authenticating access codes, monitoring unauthorized accesses and logging said system activity; and
a communication subsystem passing voice communications telephonically between said entities within said building and individuals seeking building access, said communication subsystem including said fax modem and sending and receiving faxes with a said fax modem.

21. An access control system as in claim 20 wherein said control subsystem comprises:

a microcontroller controlling building access, communicating access authorization changes to the general purpose computer and changing access code data in response to communications from said general purpose computer;

memory storing current contact and access codes, system related program code, data and system logs;

a handheld interface and real time clock communicating with said general purpose computer; and said memory module, program initialization data and operating codes contained in said memory module.

22. An access control system as in claim 21 wherein said communication subsystem comprises:

a digital signal processor, said digital signal processor being capable of functioning as a fax modem;

memory storing code for said digital signal processor; and a communications interface providing a voice interface with said microphone and audio interface with said speaker at said main control unit and providing a telephonic interface to a connected telephone system responsive to said digital signal processor.

23. An access control system selectively providing access to a building, said access control system comprising:

a main control unit telephonically in communication with entities within a building, said main control unit being mountable at an entrance to said building;

a switch mode power supply providing power from an input line voltage to said main control unit, said switch mode power supply comprising:

a full wave rectifier receiving an input line voltage, a pair of inductors connected at least one end to one side of said full-wave rectifier, a pair of transistors each connected at one conduction terminal to a second end of a corresponding one of said pair of inductors and connected at a second conduction terminal to an opposite side of said full wave rectifier, a complementary driver driving a control terminal of each of said pair of transistors, a pair of diodes, anodes of said pair of diodes each connected to a corresponding one of said pair of inductors at said second side, cathodes of said pair of diodes being connected together, a filter capacitor connected at an unregulated voltage output between said cathodes and said other side of said full wave rectifier, and at least one voltage regulator providing regulated voltage from said unregulated voltage;

a display on said main control unit displaying contact codes for selected ones of a plurality of building tenants;

at least one code entry unit receiving access codes, each said code entry unit providing received said access codes to said main control unit; and at least one controlled door, access through each said controlled door being provided by said main control unit in response to a correct access code entered at one said code entry unit, said main control unit logging system activity.

24. An access control system as in claim 23, wherein one of said at least one code entry units is a keypad located on said main control unit.

25. An access control system as in claim 24 wherein said at least one controlled door is two or more controlled doors, said main control unit controlling and logging access through said controlled doors at entrances to said building, at least one of said entrances including a remote said code entry unit.

26. An access control unit as in claim 25 further comprising a peripheral control unit in communication with said main control unit, said peripheral control unit receiving power from a second switch mode supply and controlling at least one remotely controlled door at an entrance remotely located from said main control unit, said main control unit logging peripheral control unit activity.

27. An access control unit as in claim 26 further comprising a remote said code entry unit at said remotely controlled door, said remote code entry unit communicating with said main control unit through said peripheral unit.

28. An access control system as in claim 27, the main control unit further comprising:

a memory module;

an electronics assembly receiving power from said switch mode power supply and adapted to receive said memory module, said memory module being pluggable into said electronics assembly, said display being attached to said electronics assembly and receiving power from said switch_mode power supply; and an alphanumeric keypad, said access control system being programmed directly from said alphanumeric keypad, access control codes being programmed into said main control unit using said alphanumeric keypad, program entries being selectively communicated, seamlessly, to said general purpose computer.

29. An access control system as in claim 28 wherein said electronics assembly unit comprises:

a control subsystem controlling connected peripheral units and controlled doors, display of tenant codes, contacting a corresponding tenant in response to an entered contact code, receiving and authenticating access codes, monitoring unauthorized accesses and logging said system activity; and a communication subsystem passing voice communications telephonically between said entities within said building and individuals seeking building access, said communication subsystem including said fax modem and sending and receiving faxes with a said fax modem.

30. An access control system as in claim 29 wherein said control subsystem comprises:

a microcontroller controlling building access, communicating access authorization changes to the general purpose computer and changing access code data in response to communications from said general purpose computer;

memory storing current contact and access codes, system related program code, data and system logs;

a handheld interface and real time clock communicating with said general purpose computer; and said memory module, program initialization data and operating codes contained in said memory module.

31. An access control system as in claim 29 wherein said communication subsystem comprises:

a digital signal processor, said digital signal processor being capable of functioning as a fax modem;

memory storing code for said digital signal processor; and a communications interface providing a voice interface with said microphone and audio interface with said speaker at said main control unit and providing a telephonic interface to a connected telephone system responsive to said digital signal processor.

32. An access control system as in claim 23 wherein said full wave rectifier in said switched mode power supply is a bridge rectifier.

33. An access control system as in claim 32, the switched mode power supply further comprising an electromagnetic interference filter between said full wave rectifier and said pair of inductors.

34. An access control system as in claim 33, the switched mode power supply further comprising a balun transformer between said input line voltage and said bridge rectifier.

35. An access control system as in claim 34 wherein said pair of transistors in said switched mode power supply is a pair of field effect transistors (FETs).

36. An access control system as in claim 35 wherein said driver in said switched mode power supply provides a pair of complementary outputs, each of said complementary outputs driving a gate of one of said pair of FETs.

37. An access control system as in claim 36 wherein said diodes in said switched mode power supply are a pair of zener diodes, said zener diodes being rated for a reverse bias voltage above unregulated voltage, said zener diodes further providing over-voltage protection to said regulators.

38. A power supply for supplying DC voltage comprising:
 a rectifier having an input signal input and a rectified signal output node;
 a first circuit comprising:
  a first switch coupled to the first inductor;
 a second circuit comprising:
  a second inductor coupled to the rectified signal output node;
  a second switch coupled to the second inductor;
 an oscillator coupled to selectively switch the first and second switches, wherein the oscillator has an output signal frequency substantially greater than a frequency of an input signal as is provided at the input signal input of the rectifier.

39. The power supply of claim 38 and further comprising a driver that couples the oscillator to both the first and second switch.

40. The power supply of claim 39 wherein the driver has a non-inverting output that couples to the first switch and an inverting output that couples to the second switch.

41. The power supply of claim 38 and further comprising:
 a first diode that is coupled to the first inductor; and
 a second diode that is coupled to the second inductor and to the first diode.

42. The power supply of claim 41 and further comprising a capacitor coupled across the rectifier and the first and second diode.

* * * * *